United States Patent

Hegner et al.

[11] Patent Number: 6,156,130
[45] Date of Patent: Dec. 5, 2000

[54] SCREEN-PRINTABLE OR DISPENSABLE ACTIVE BRAZING PASTES AND PROCESS FOR PRODUCING THE SAME

[76] Inventors: Frank Hegner, Chrischonastrasse 41, 79539 Lörrach; Elke Maria Schmidt, Wallstrasse 5, 79650 Schopfheim; Theophil Eicher, Am Botanischen Garten 1, 66123 Saarbrücken; Peter Otschick, Zum Marktsteig 17, 01728 Possendorf; Winfried Schaffrath, Comeniusstrasse 30, 01307 Dresden, all of Germany

[21] Appl. No.: 09/385,790

[22] Filed: Aug. 30, 1999

Related U.S. Application Data

[60] Provisional application No. 60/105,635, Oct. 26, 1998.

[30] Foreign Application Priority Data

Sep. 22, 1998 [EP] European Pat. Off. .............. 98117901

[51] Int. Cl.⁷ .................................................. B23K 35/363
[52] U.S. Cl. .......................... 148/24; 148/25; 228/262.51
[58] Field of Search .................... 148/24, 25; 228/262.51

[56] References Cited

U.S. PATENT DOCUMENTS

| | | | |
|---|---|---|---|
| 4,924,033 | 5/1990 | Iyogi et al. | 174/259 |
| 5,019,187 | 5/1991 | Iyogi et al. | 148/24 |
| 5,095,759 | 3/1992 | Mizuhara et al. | 420/507 |
| 5,334,344 | 8/1994 | Hegner et al. | 420/422 |
| 5,431,744 | 7/1995 | Breme et al. | 148/22 |
| 5,577,655 | 11/1996 | Mizuhara | 228/56.3 |
| 5,690,271 | 11/1997 | Dudel | 148/26 |
| 5,776,620 | 7/1998 | Josso et al. | 428/610 |
| 5,851,311 | 12/1998 | Diamant et al. | 148/24 |

FOREIGN PATENT DOCUMENTS 0 835 716  4/1998  European Pat. Off. .

*Primary Examiner*—George Wyszomierski
*Attorney, Agent, or Firm*—Bose McKinney & Evans LLP

[57] ABSTRACT

These active brazing pastes satisfy the requirements for screen printing or dispensing particularly well and are well suited for brazing one aluminum oxide ceramic body to another one or to a metal body. This can be done by means of respective regions of brazing paste applied by screen printing to the ceramic bodies, with the coverage of one region matching the coverage of the other region or by inserting the metal body into a hole in the ceramic body and using a pad of brazing paste applied to the ceramic body and to the metal body by dispensing. The printable paste comprises as the active brazing material a hydrogenated powder of a Zr/Ni/Ti alloy or a Zr/Fe/Ti/Be alloy and as an organic vehicle poly(butyl-methyl methacrylate) or poly(n-decyl methacrylate) as the polymer and the camphor ketal of 2,2,4-trime-thylpentane-1,3-diol and/or 5-nonyl-methyl ether as the solvent for the polymer. The dispensable paste comprises as the active brazing material the same powder and as the organic vehicle a mixture of poly (butylmethyl methacrylate) dissolved in the camphor ketal of 2,2,4-trimethylpentane-1,3-diol as a first solvent, as a first component of the mixture and poly(butylmethacrylate) dissolved in 5-nonyl methyl ether, as a second solvent, as a second component of the mixture.

11 Claims, No Drawings

SCREEN-PRINTABLE OR DISPENSABLE ACTIVE BRAZING PASTES AND PROCESS FOR PRODUCING THE SAME

This application claims benefit to Provisional Application Ser. No. 60/105,635 filed Oct. 26, 1998.

BACKGROUND OF THE INVENTION

1. Field of the Invention

The invention concerns a screen-printable or dispensable active brazing paste for brazing a first aluminum oxide ceramic body to a second aluminum oxide ceramic body, and a dispensable active brazing paste for brazing an aluminum oxide ceramic body to a metal body, and processes for producing them.

The invention further concerns a process for producing an actively brazed bond between a first aluminum oxide ceramic body and a second aluminum oxide ceramic body using a first region of active brazing paste applied to the first aluminum oxide ceramic body by screen printing and a second region of active brazing paste covering the same area as the first region, applied to the second aluminum oxide body by screen printing, and a process for actively brazing a metal body inserted into a hole in an aluminum oxide ceramic body using a pad of active brazing paste applied by dispensing.

2. Description of the Related Art

U.S. Pat. No. 5,095,759 describes an active brazing paste for brazing a platinum electrode to an aluminum oxide ceramic body, in which the active brazing paste comprises:

- as the active brazing alloy a 99.5%/0.5% mixture of a 98% Au/2% Ni powder and
- a titanium hydride powder, and
- as the organic vehicle, a gel of 1.25% hydroxypropylcellulose and 98.7% 1,2-propanediol,
- such that 90% of the active brazing paste is made up of the 99.5%/0.5% mixture and 10% is made up of the gel.

Thus, this state of the art shows that active brazing pastes are usually a dispersion of a powder of the metallic component of the active brazing paste in an organic vehicle. That, in turn, is a polymer in a solvent. The particles of the powder are as homogeneously distributed as possible in the vehicle, and thus intimately combined with it.

Various Zr/Ni/Ti alloys suitable for use as an active brazing material to braze a first aluminum oxide ceramic body to a second aluminum oxide ceramic body are described in U.S. Pat. No. 5,334,344. Foils are produced from the alloy by melt-spinning, and the shapes needed for brazing can be punched from the foils.

Various Zr/Fe/Ti/Be alloys are described in CA-A 22 11 471. They are also suitable as active brazing materials for brazing two aluminum oxide bodies together.

U.S. Pat. No. 5,431,744 describes how hydrogenated powders which do not lose hydrogen, but remain stable, in air can be produced.

A screen-printable active brazing paste and a dispensable active brazing paste are of interest in this invention with regard to their consistency.

SUMMARY OF THE INVENTION

In the context of this invention, "screen-printable" is understood to mean that the active brazing paste is compact, viscous and thixotropic so that regions of active brazing paste of specified dimensions, with specified shape and thickness, can be applied to the aluminum oxide ceramic using ordinary silk screen-printing processes, and that these regions retain their shape after printing. That is, the active brazing paste must be intrinsically viscous enough that it does not flow away from the printed regions.

In the context of this invention, "dispensable" is understood to mean that the active brazing paste should be compact, thixotropic, and less viscous than required for screen printing so that it can, for example, be applied from a nozzle or the like at a specified location as individual dots with specified limited dimensions, and that it should then retain its shape as much as possible, and thus should as much as possible not flow away. Obviously, multiple dots can be applied adjacent to each other to produce lines, etc.

One object of the invention is to disclose screen-printable or dispensable active brazing pastes which satisfy the requirements for screen printing or dispensing particularly well, and which are particularly well suited for brazing a first aluminum oxide ceramic body to a second aluminum oxide ceramic body, or one aluminum oxide ceramic body to a metal body.

Another object is to disclose a process for making an actively brazed bond between a first aluminum oxide ceramic body and a second aluminum oxide ceramic body by means of a first region of active brazing paste applied by screen printing to the first aluminum oxide ceramic body and a second region of active brazing paste applied by screen printing to the second aluminum oxide ceramic body, with the coverage of the first region matching the coverage of the second region, using a Zr/Ni/Ti or a Zr/Fe/Ti/Be alloy, and a process for actively brazing a metal body inserted into a hole in an aluminum oxide ceramic body to the aluminum oxide ceramic body using a pad of active brazing paste applied to the aluminum oxide ceramic body and to the metal body by dispensing.

To solve these objects, a first variant of the invention consists in a screen-printable active brazing paste for brazing a first aluminum oxide ceramic body to a second one, comprising:

- as the active brazing material a hydrogenated powder of a Zr/Ni/Ti alloy or a Zr/Fe/Ti/Be alloy and,
- as an organic vehicle
  - poly(butylmethyl methacrylate) or poly(n-decylmethacrylate) as the polymer and
  - the camphor ketal of 2,2,4-trimethylpentane-1,3-diol and/or 5-nonylmethyl ether as the solvent for the polymer.

To solve the aforementioned objects, a second variant of the invention consists in a dispensable active brazing paste for brazing a first aluminum oxide ceramic body to a second aluminum oxide ceramic body, or an aluminum oxide ceramic body to a metal body, comprising:

- as the active brazing material a hydrogenated powder of a Zr/Ni/Ti alloy or a Zr/Fe/Ti/Be alloy and
- as an organic vehicle a mixture of
  - poly(butylmethyl methacrylate) dissolved in the camphor ketal of 2,2,4-trimethylpentane-1,3-diol as a first solvent, as a first component of the mixture and
  - poly(butylmethacrylate) dissolved in 5-nonyl methyl ether, as a second solvent, as a second component of the mixture.

To solve the aforementioned objects, a third variant of the invention consists in a process for producing a screen-printable active brazing paste, comprising:

- as the active brazing material a hydrogenated powder of a Zr/Ni/Ti alloy or a Zr/Fe/Ti/Be alloy and,
- as an organic vehicle poly(butylmethyl methacrylate) or poly(n-decylmethacrylate) as the polymer and the camphor ketal of 2,2,4-trimethylpentane-1,3-diol and/or 5-nonylmethyl ether as the solvent for the polymer, in which process, after dissolving the polymer in the solvent in a first step, in air or in a protective gas atmosphere, a specified amount of the powder is mixed with just enough vehicle that all the particles of the powder are wetted, and, in a second step, in air, the particles of the powder are completely dispersed mechanically in the vehicle.

To solve the aforementioned objects, a fourth variant of the invention consists in a process for producing a dispensable active brazing paste, comprising:

as the active brazing material a hydrogenated powder of a Zr/Ni/Ti alloy or a Zr/Fe/Ti/Be alloy and as an organic vehicle a mixture of poly(butylmethyl methacrylate) dissolved in the camphor ketal of 2,2,4-trimethylpentane-1,3-diol as a first solvent, as a first component of the mixture and poly(butylmethacrylate) dissolved in 5-nonyl methyl ether, as a second solvent, as a second component of the mixture, in which process, after production of the two components of the mixture, and their mixture, in a first step, a specified quantity of powder is mixed, in air or in a protective gas atmosphere, with just enough vehicle that all the particles of the powder are wetted by the vehicle, and in a second step, in air, the particles of the powder are completely dispersed mechanically in the vehicle.

To solve the aforementioned objects, a fifth variant of the invention consists in a process for producing an active brazed bond between a first aluminum oxide ceramic body and a second aluminum oxide ceramic body using a first region of active brazing paste applied to the first aluminum oxide ceramic body by screen printing or dispensing and a second region of the active brazing paste congruent with the first region and applied to the second aluminum oxide ceramic body by screen printing or dispensing, comprising:

as the active brazing material a hydrogenated powder of a Zr/Ni/Ti alloy or a Zr/Fe/Ti/Be alloy and, as an organic vehicle poly(butylmethyl methacrylate) or poly(n-decylmethacrylate) as the polymer and the camphor ketal of 2,2,4-trimethylpentane-1,3-diol and/or 5-nonylmethyl ether as the solvent for the polymer, in which process the first region is applied to the first aluminum oxide ceramic body and the second region is applied to the second aluminum oxide ceramic body then both regions are dried in air at about 100° C.

then the two regions with the two aluminum oxide ceramic bodies are placed in contact with each other, are then heated in a reactor held at high vacuum at temperatures increasing by a rate of about 3K/min up to about 125° C. and held at that temperature until the solvent has evaporated, then the bodies are heated in the same reactor at temperatures increasing by a rate of about 1.5K/min up to about 400° C. and are heated at that temperature until the polymer has completely decomposed, and then they are brazed in the same reactor at high vacuum at about 900° C.

To solve the aforementioned objects, a sixth variant of the invention consists in a process for actively brazing a metal body inserted into a hole in an aluminum oxide ceramic body using pads of an active brazing paste applied by dispensing to the aluminum oxide ceramic body and to the metal body, comprising:

as the active brazing material a hydrogenated powder of a Zr/Ni/Ti alloy or a Zr/Fe/Ti/Be alloy and as an organic vehicle a mixture of poly(butylmethyl methacrylate) dissolved in the camphor ketal of 2,2,4-trimethylpentane-1,3-diol as a first solvent, as a first component of the mixture and poly(butylmethacrylate) dissolved in 5-nonyl methyl ether, as a second solvent, as a second component of the mixture, in which process, the active brazing paste applied is heated in a reactor with temperatures increasing by a rate of about 1.5K/min up to about 400° C. and heated at that temperature until the solvent has evaporated and the polymer has completely decomposed, and then the aluminum oxide ceramic body and the metal body are brazed under high vacuum in the same reactor at about 900° C.

In a first preferred embodiment of the first variant of the invention using poly(butylmethyl methacrylate) or poly(n-decyl methacrylate) as the polymer and the camphor ketal of 2,2,4-trimethylpentane-1,3-diol as the solvent, the active brazing paste comprises 70% to 90% by weight active brazing powder and 30% to 10% by weight vehicle, which itself comprises 5% to 10% polymer and 95% to 90% solvent.

In a further preferred embodiment of this first embodiment, the active brazing paste comprises 82.4% by weight active brazing powder and 17.6% by weight vehicle, which itself comprises 7.5% by weight polymer and 92.5% by weight solvent.

In a second preferred embodiment of the first variant of the invention with poly(butylmethyl methacrylate) as the polymer and 5-nonyl methyl ether as the solvent, the active brazing paste comprises 65% to 90% by weight active brazing powder and 35% to 10% by weight vehicle, which itself comprises 20% to 30% polymer and 80% to 70% solvent.

In a further preferred embodiment of this second embodiment, the active brazing paste comprises 75% by weight active brazing powder and 25% by weight vehicle, which itself comprises 25% by weight polymer and 75% by weight solvent.

In a preferred embodiment of the second variant of the invention, the active brazing paste comprises 70% to 90% by weight of active brazing powder and 30% to 10% by weight vehicle, which itself comprises 12% to 25% by weight polymer and 88% to 75% solvent, and in which the ratio of the first solvent to the second solvent is about 1:2.

In a further preferred embodiment of the second variant of the invention the active brazing paste comprises 80.8% to 83.9% by weight active brazing powder and 16.1% to 19.2% by weight vehicle, which itself comprises 19.75% to 19.80% by weight polymer and 80.25% to 80.20% by weight solvents.

The invention has the following advantages:

The screen-printable active brazing pastes have the rheologic properties required for screen printing; that is, they have the necessary intrinsic viscosity and the necessary ability to wet the ceramic body and/or the metal body.

The screen-printable and dispensable active brazing pastes are sufficiently stable to sedimentation. That is, the particles in the finished active brazing paste settle extremely slowly if at all.

There is no chemical reaction in the active brazing pastes between the vehicle and the surface of the particles at ambient temperature, i.e. about 20° C.

When the vehicle decomposes thermally, no carbon-containing residues which could deactivate the active brazing compound during brazing remain on the surfaces of the powder particles.

The active brazing pastes accordingly adhere very well to the ceramic and metal bodys, and even after brazing the adhesion, mechanical strength, and density of the brazed bonds are so outstanding that they do not tear off in the bending test. The breakage occurs only within the ceramic, and the soldered bonds remain vacuum-tight for a long time.

The solvents evaporate in vacuum without residue, even below 200° C.

The vehicle of the screen-printable or dispensable active brazing pastes can be removed before brazing without leaving a residue and without causing difficulty, especially in a high vacuum (on the order of $10^{-9}$ bar=$10^{-4}$ Pa) at no more than 400° C., so that there are no residues on the bodies which are yet to be brazed.

The spreading behavior of the active brazing pastes, that is, their ability to flow at the brazing temperature, is outstanding.

DETAILED DESCRIPTION OF PREFERRED EMBODIMENTS

The invention, and further advantages, are now explained in more detail using preferred embodiments of the active brazing pastes and the process variations of the invention.

The following applies for all examples: A hydrogenated powder of a Zr/Ni/Ti alloy or a Zr/Fe/Ti/Be alloy with a grain size not greater than 40 μm is used. The particular compositions of these alloys emphasized in the previous discussion of the state of the art are preferred. The vehicle is made up of a polymer and a solvent for the polymer. The polymer is either poly(butylmethyl methacrylate) or poly(n-decyl methacrylate). The solvent is either the camphor ketal of 2,2,4-trimethylpentane-1,3-diol or 5-nonyl methyl ether, and vehicles containing both solvents may be used.

EXAMPLE 1

A screen-printable active brazing paste using the camphor ketal of 2,2,4-trimethylpentane-1,3-diol as the solvent comprises 70% to 90% by weight, and in particular, 82.4% by weight powder, and 30% to 10% by weight, in particular 17.6% by weight vehicle. The vehicle comprises 5% to 10% by weight, in particular, 7.5% by weight, polymer and 95% to 90% by weight, in particular, 92.5% by weight, solvent.

EXAMPLE 2

A screen-printable active brazing paste with 5-nonyl methyl ether as the solvent comprises 65% to 90% by weight, in particular, 75% by weight, active brazing powder and 35% to 10% by weight, in particular, 25% by weight, vehicle. The vehicle comprises 20% to 30% by weight, in particular, 25% by weight, polymer and 80% to 70% by weight, particularly 75% by weight, solvent.

A first aluminum oxide ceramic body can be brazed to a second aluminum oxide ceramic body with the active brazing pastes of Example 1 or 2. The aluminum oxide can be of the usual purity (96%). It can, but need not, be highly pure (99.9%).

Capacitive or resistive pressure sensors are a principal area of application of aluminum oxide ceramic bodies with must be brazed. For example, a capacitive pressure sensor comprises a disk-shaped substrate and a thin disk-shaped membrane. The two parts are brazed together at their edges. The facing areas of the substrate and membrane have metal surfaces, of tantalum, for instance.

The amount of active brazing compound required is set by screen-printing or dispensing (see Example 3 for more details). This quantity is determined so that it also acts as a spacer ring between the substrate and membrane during brazing, forming a chamber between the substrate and membrane.

Away from the brazed joint, then, the membrane is separated from the substrate, and the two metal surfaces form an electrical capacitor. Furthermore, the membrane moves when pressure acts on it. That alters the distance between the two metal surfaces, so that the capacitor changes its capacitance.

For such a capacitive pressure sensor to be used as an absolute pressure sensor, for instance, the brazed bond must be tight to high vacuum for a long time.

EXAMPLE 3

A dispensable active brazing paste contains poly (butylmethyl methacrylate) as a first mixture component dissolved in the camphor ketal of 2,2,4-trimethylpentane-1, 3-diol as a first solvent, and poly(butylmethyl methacrylate) as a second mixture component dissolved in 5-nonyl methyl ether as a second solvent.

This active brazing paste comprises 70% to 90% by weight, in particular 80.8% to 83.9% by weight, active brazing powder and 30% to 10% by weight, in particular 16.1% to 19.2% by weight, vehicle. The vehicle comprises 12% to 25% by weight, in particular, 19.75% to 19.80% by weight, polymer, and 88% to 75% by weight, in particular, 80.25% to 80.20% by weight solvents, with the ratio of the first solvent to the second solvent being about 1:2.

With the active brazing paste according to Example 3, a first aluminum oxide ceramic body can be brazed to a second aluminum oxide ceramic body, or an aluminum oxide ceramic body can be brazed to a metal body.

One major area of application of the brazing initially mentioned is, again, the ceramicceramic brazing of capacitive pressure sensors. In this case, as noted just above, a ring of active brazing paste made of many adjacent dots in contact with each other is applied to the edge of the membrane and to the edge of the substrate.

Metal-ceramic active brazing is also used for these capacitive pressure sensors. It is necessary to make electrical contacts with the metal areas acting as capacitor plates, as noted above. That is accomplished for the metal surface of the membrane through the fact that it extends into the brazed joint and contact is made there, as it is accessible from the outside.

On the other hand, the metal surface of the substrate is contacted by inserting a metal pin, which may, for instance, also be of tantalum, from the outside through a hole provided in the substrate. The metal pin extends through this hole to the metal surface, and the metal pin must be brazed into the hole.

Another major area of application of metal-ceramic active brazing, mentioned above, is found in electromagnetic flow meters with ceramic measuring tubes, see U.S. Pat. No. 5,095,759, mentioned at the beginning. Here, at least two metal pins acting as electrodes must be brazed in place. They extend to the inner surface of the measuring tube, and pick off a voltage induced by an electrically conductive liquid flowing through the measuring tube, induced acc. to Faraday's law of induction by a magnetic field.

EXAMPLE 4

A screen-printable active brazing paste is produced as follows: First, the polymer is dissolved in the solvent. That is done by stirring, and specifically by mechanical stirring for large quantities.

Then, in a first step, a specified amount of powder is mixed with just enough vehicle so that all the particles of the powder are wetted by the vehicle. That is, the "oil value" is set. That is done in air or in a protective gas atmosphere; under argon, for instance.

Finally, in a second step, the particles of the powder are completely dispersed mechanically in the vehicle in air. An ordinary three-roll machine can be used for that.

EXAMPLE 5

A dispensable active brazing paste is produced as follows: First, the two components of the mixture are produced. That is, the poly(butylmethyl methacrylate) is dissolved in the camphor ketal of 2,2,4-trimethylpentane-1,3-diol and in 5-nonyl methyl ether. That is done by stirring, and particularly by mechanical stirring for large quantities. Then the mixture components are mixed in the required proportions, such as mentioned in Example 3 above.

Then, in a first step, a specified amount of powder is mixed with just enough vehicle so that all the particles of the powder are wetted by the vehicle. That is, the oil value is set again. That is done in air or in a protective gas atmosphere; under argon, for instance.

Finally, in a second step, the particles of the powder are completely dispersed mechanically in the vehicle in air. An ordinary three-roll machine can be used for that.

EXAMPLE 6

Two aluminum oxide ceramic bodies are brazed together as follows: A first region of active brazing paste is applied to the first aluminum oxide ceramic body by screen-printing or dispensing. A second region of active brazing paste congruent with the first region is applied in the same manner to the second aluminum oxide ceramic body.

Then both regions are dried in air at 100° C., and are placed together with the two aluminum oxide ceramic bodies together, and the aluminum oxide ceramic bodies are heated in a reactor held at high vacuum with temperatures rising at a rate of 3K/min up to 125° C. and held at that temperature until the solvent has evaporated.

Then the aluminum oxide ceramic bodies are heated in the same reactor, with temperature rising at a rate of 1.5K/min up to 400° C. and held at that temperature until the binder has been destroyed, so that the powder is free of the vehicle, which can also be called the binder, until the polymer has completely decomposed and vaporized. Finally, the aluminum oxide ceramic bodies are brazed in the same reactor at 900° C. under high vacuum.

EXAMPLE 7

An aluminum oxide ceramic body and a metal body inserted into a hole in the aluminum oxide ceramic body are brazed as follows: Dots of the active brazing paste are dispensed in the shape of a pad on the aluminum oxide ceramic body and on the metal body.

If, in this process, the metal body is aligned with the outer surface of the aluminum oxide ceramic body, the pad can cover the end of the metal body up to the ceramic. If the metal body extends beyond the outer surface, then the pad is laid down in a ring shape around the metal body. Then the active brazing paste which has been applied is heated in a reactor with temperatures rising at a rate of 1.5K/min up to 400° C. and held at that temperature until the solvent has evaporated and the polymer has decomposed completely.

Finally the aluminum oxide ceramic body and the metal body are brazed in the reactor under high vacuum at 900° C.

What is claimed is:

1. A screen-printable active brazing paste for brazing a first aluminum oxide ceramic body to a second aluminum oxide ceramic body, comprising:

an active brazing material comprising a hydrogenated powder of an alloy selected from a alloy group consisting of a Zr/Ni/Ti alloy and a Zr/Fe/Ti/Be alloy, and an organic vehicle comprising a polymer selected from a polymer group consisting of poly(butylmethyl methacrylate) and poly(n-decylmeth-acrylate), and a solvent for the polymer comprising a camphor ketal of at least one solvent selected from a solvent group consisting of 2,2,4-trimethylpentane-1,3-diol and 5-nonylmethly ether.

2. The screen-printable active brazing paste of claim 1, wherein the solvent selected from the solvent group is 2,2,4-trimethylpentane-1,3-diol, the screen-printable active brazing paste comprises 70% to 90% by weight of the active brazing material and 30% to 10% by weight of the organic vehicle, and the organic vehicle comprises 5% to 10% by weight of the polymer and 95% to 90% by weight of the solvent for the polymer.

3. The screen-printable active brazing paste of claim 1, wherein the solvent selected from the solvent group is 2,2,4-trimethylpentane-1,3-diol, the screen-printable active brazing paste comprises 82.4% by weight of the active brazing material and 17.6% by weight of the organic vehicle, and the organic vehicle comprises 7.5% by weight of the polymer and 92.5% by weight of the solvent for the polymer.

4. The screen-printable active brazing paste of claim 1, wherein the polymer selected from the polymer group is poly (butylmethyl methacrylate), and the solvent selected from the solvent group is 5-nonyl methyl ether, the screen-printable active brazing paste comprises 65% to 90% by weight of the active brazing material and 35% to 10% by weight of the organic vehicle, and the organic vehicle comprises 20% to 30% by weight of the polymer and 80% to 70% by weight of the solvent for the polymer.

5. The screen-printable active brazing paste of claim 1, wherein
the polymer selected from the polymer group is poly(butylmethyl methacrylate), and
the solvent selected from the solvent group is 5-nonyl methyl ether,
the screen-printable active brazing paste comprises 75% by weight of the active brazing material and 25% by weight of the organic vehicle, and
the organic vehicle comprises 25% by weight of the polymer and 75% by weight of the solvent for the polymer.

6. A dispensable brazing paste for brazing a first aluminum oxide ceramic body to a second aluminum oxide ceramic body, comprising:
an active brazing material comprising a hydrogenated powder of an alloy selected from a alloy group consisting of a Zr/Ni/Ti alloy and a Zr/Fe/Ti/Be alloy, and
an organic vehicle mixture comprising
poly(butylmethyl methacrylate) dissolved in a camphor ketal of 2,2,4-trimethylpentane-1,3-diol, and
poly(butylmethacrylate) dissolved in 5-nonylmethly ether.

7. The dispensable active brazing paste of claim 6, wherein
the dispensable active brazing paste comprises 70% to 90% by weight of the active brazing material and 30% to 10% by weight of the organic vehicle mixture,
the organic vehicle mixture comprises 12% to 25% by weight of poly(butylmethyl methacrylate) and poly(butylmethacrylate) and 88% to 75% by weight of the camphor ketal of 2,2,4-trimethylpentane-1,3-diol and the 5-nonylmethly ether, and
the ratio of the camphor ketal of 2,2,4-trimethylpentane-1,3-diol to the 5-nonylmethly ether is about 1:2.

8. The dispensable active brazing paste of claim 6, wherein
the dispensable active brazing paste comprises 80.8% to 83.9% by weight of the active brazing material and 16.1% to 19.2% by weight of the organic vehicle mixture,
the organic vehicle mixture comprises 19.75% to 19.80% by weight of the poly(butylmethyl methacrylate) and the poly(butylmethacrylate) and 80.25% to 80.20% by weight of the camphor ketal of 2,2,4-trimethylpentane-1,3-diol and the 5-nonylmethly ether, and
the ratio of the camphor ketal of 2,2,4-trimethylpentane-1,3-diol to the 5-nonylmethly ether is about 1:2.

9. A dispensable brazing paste for brazing an aluminum oxide ceramic body to a metal body, comprising:
an active brazing material comprising a hydrogenated powder of an alloy selected from a alloy group consisting of a Zr/Ni/Ti alloy and a Zr/Fe/Ti/Be alloy, and
an organic vehicle mixture comprising
poly(butylmethyl methacrylate) dissolved in a camphor ketal of 2,2,4-trimethylpentane-1,3-diol, and
poly(butylmethacrylate) dissolved in 5-nonylmethly ether.

10. The dispensable active brazing paste of claim 9, wherein
the dispensable active brazing paste comprises 70% to 90% by weight of the active brazing material and 30% to 10% by weight of the organic vehicle mixture,
the organic vehicle mixture comprises 12% to 25% by weight of poly(butylmethyl methacrylate) and poly(butylmethacrylate) and 88% to 75% by weight of the camphor ketal of 2,2,4-trimethylpentane-1,3-diol and the 5-nonylmethly ether, and
the ratio of the camphor ketal of 2,2,4-trimethylpentane-1,3-diol to the 5-nonylmethly ether is about 1:2.

11. The dispensable active brazing paste of claim 9, wherein
the dispensable active brazing paste comprises 80.8% to 83.9% by weight of the active brazing material and 19.2% to 16.1% by weight of the organic vehicle mixture,
the organic vehicle mixture comprises 19.75% to 19.80% by weight of the poly(butylmethyl methacrylate) and the poly(butylmethacrylate) and 80.25% to 80.20% by weight of the camphor ketal of 2,2,4-trimethylpentane-1,3-diol and the 5-nonylmethly ether, and
the ratio of the camphor ketal of 2,2,4-trimethylpentane-1,3-diol to the 5-nonylmethly ether is about 1:2.

* * * * *

UNITED STATES PATENT AND TRADEMARK OFFICE
CERTIFICATE OF CORRECTION

PATENT NO.   : 6,156,130
DATED        : December 5, 2000
INVENTOR(S)  : Frank Hegner, Elke Maria Schmidt, Theophil Eicher, Peter Otschick, and Winfried Schaffrath It is certified that error appears in the above-identified patent and that said Letters Patent is hereby corrected as shown below:

The following Assignee should be added:
    Endress + Hauser GambH + Co.

Signed and Sealed this

Twenty fifth Day of September, 2001

Attest:

NICHOLAS P. GODICI
Attesting Officer    Acting Director of the United States Patent and Trademark Office

UNITED STATES PATENT AND TRADEMARK OFFICE
CERTIFICATE OF CORRECTION

PATENT NO. : 6,156,130
DATED : December 5, 2000
INVENTOR(S) : Frank Hegner, Elke Maria Schmidt, Theophil Eicher, Peter Otschick, and Winfried Schaffrath It is certified that error appears in the above-identified patent and that said Letters Patent is hereby corrected as shown below:

The following Assignee should be added:
    Endress + Hauser GmbH + Co.

This certificate supersedes Certificate of Correction issued September 25, 2001.

Signed and Sealed this

Eighteenth Day of December, 2001

Attest:

Attesting Officer

JAMES E. ROGAN
Director of the United States Patent and Trademark Office